US008958417B2

(12) United States Patent
Zhao et al.

(10) Patent No.: US 8,958,417 B2
(45) Date of Patent: Feb. 17, 2015

(54) METHOD AND SYSTEM FOR CALL ADMISSION CONTROL IN A WIRELESS MESH NETWORK

(75) Inventors: Fuyong Zhao, San Jose, CA (US); Song Ching Chen, Los Altos, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 662 days.

(21) Appl. No.: 11/768,803

(22) Filed: Jun. 26, 2007

(65) Prior Publication Data

US 2009/0003324 A1    Jan. 1, 2009

(51) Int. Cl.
| | |
|---|---|
| H04L 12/66 | (2006.01) |
| H04L 29/06 | (2006.01) |
| H04L 12/54 | (2013.01) |
| H04L 12/911 | (2013.01) |

(52) U.S. Cl.
CPC ............ *H04L 65/80* (2013.01); *H04L 12/5695* (2013.01); *H04L 47/822* (2013.01); *H04L 47/824* (2013.01); *H04L 65/1006* (2013.01)
USPC ....................................................... 370/353

(58) Field of Classification Search
CPC ... H04L 65/80; H04L 12/5695; H04L 47/822; H04L 47/824
USPC .......................... 370/338, 352, 328; 455/456.2
See application file for complete search history.

(56) References Cited

U.S. PATENT DOCUMENTS

| | | | |
|---|---|---|---|
| 7,002,963 B1* | 2/2006 | Buyukkoc et al. ......... | 370/395.1 |
| 2006/0133272 A1* | 6/2006 | Yuan et al. ..................... | 370/230 |
| 2007/0097867 A1* | 5/2007 | Kneckt et al. ................. | 370/236 |
| 2007/0121557 A1* | 5/2007 | Sylvain ......................... | 370/338 |
| 2007/0254675 A1* | 11/2007 | Zorlu Ozer et al. ......... | 455/456.2 |
| 2008/0080414 A1* | 4/2008 | Thubert et al. ................ | 370/328 |

FOREIGN PATENT DOCUMENTS

GB          2411549 A    *    8/2005  .............. H04L 12/28

* cited by examiner

*Primary Examiner* — Sonia Gay
(74) *Attorney, Agent, or Firm* — Ying Wang

(57) ABSTRACT

A method and system for call capacity control in a mesh network are disclosed. The mesh network uses on-device SIP proxy and includes multiple client devices, mesh points ("MPs"), and mesh access points ("MAPs"). The method of updating call capacity information ("CCI") is also disclosed. Adaptive Wireless Routing ("AWR") protocol is used to establish connectivity among all the mesh access points. Messages are sent to one or more of the plurality of nodes on a periodic basis or as triggered by changes in the call capacity of an MAP, wherein the routing update messages include call capacity information. CAC modules on mesh portals or mesh access points can use the call capacity information to build up a CCI database for all the MAPs in the mesh cloud to assist in the CAC decision-making.

25 Claims, 7 Drawing Sheets

| Location / Availability Header 220 | Normal Header with destination information 210 |

200

METHOD AND SYSTEM FOR CALL ADMISSION CONTROL IN A WIRELESS MESH NETWORK

FIELD OF THE INVENTION

The field of the invention relates generally to wireless networks and more particularly relates to a method and system for call admission control using on-device Session Initiation Protocol ("SIP") proxy in wireless mesh networks.

BACKGROUND

With recent technological advancements in computer and wireless communications, mobile wireless computing has seen increasingly widespread use and application. Not constrained by wires, users with mobile computing devices can move around freely at their convenience, and may often need to communicate with each other in circumstances where there is no fixed infrastructure. In such cases, they can form a mobile ad hoc network (MANET) or mobile wireless mesh network. A mobile wireless mesh network is an autonomous system of wireless mobile routers (and associated hosts), which can move randomly and re-organize themselves into an arbitrary network without any underlying backbone and infrastructure.

Besides mobile wireless mesh networks, recently, interesting commercial applications of fixed wireless mesh networks have also emerged. One example of such a commercial application is "community wireless networks," which are used to provide broadband Internet access to communities that previously did not have such access. In these fixed "community wireless networks", each wireless router in the network not only provides Internet access for attached users, but also becomes part of the network infrastructure and can route data through the wireless mesh network to its destination. A routed wireless mesh network is highly flexible and inherently fault-tolerant. It simplifies line-of-sight problems and extends the reach and coverage of the network with a minimal amount of network infrastructure and interconnection costs.

There are also hybrid wireless mesh networks where some mesh routers are mobile and the others are not. In whatever cases (whether mobile or fixed or hybrid), wireless mesh networks have some salient characteristics, such as: highly dynamic, autonomous, peer-to-peer, multi-hop, often limited bandwidth and computing power etc. The wireless mesh networks are highly dynamic for two reasons: First, the routers themselves may move (e.g. in mobile or hybrid wireless mesh networks), causing fast topological changes. Second, even if the routers themselves don't move (e.g. in fixed wireless mesh networks), the radio link qualities can change very quickly because of interference, geographical and environmental factors etc. The traditional routing protocols (e.g. OSPF, RIP), designed for wired infrastructures, can not handle such rapid changes. Many of the ad hoc routing protocols (e.g. AODV), lack the ability to flexibly adapt to the radio link quality changes.

Voice over Internet Protocol (VOIP) is expected to be a key application in wireless mesh networks. VoIP enables voice telephone calls to be made over existing Internet infrastructure by digitizing sound into standard Internet Protocol data packets. This stream of data travels over the standard Internet infrastructure to its destination. If the destination is another VoIP device, the digitized data stream is converted into sound on the device; if the destination is a traditional telephone, the stream is converted into an analog signal by a special gateway device and then travels through traditional telephone lines. This is a potentially market disruptive application, as it allows wireless devices to make telephone calls without requiring access to traditional cell-phone based infrastructure.

VoIP requires certain quality of service guarantees from the Internet infrastructure in order to avoid interruptions or dropouts in continuous voice signals. During the initiation of a call, the access points in a VoIP network will ensure that there is sufficient capacity within the network to ensure continuous, smooth voice transmission. The decision as to whether a network can support a newly initiated or incoming VoIP call is called Call Admission Control (CAC). Call Admission Control is complicated by the dynamically changing nature of the network. In particular, mobile mesh networks encounter constantly changing structure as devices and access points move in to, out of, and across the mesh.

The method and system described below enable access points in a mesh network to act as a Session Initiation Protocol (SIP) proxy for relaying SIP messages between user agents. According to the invention, location and availability information for an access point is provided as an additional header field in standard SIP call requests and responses. The information in this header can then be used to form either a centralized or distributed CAC system. In the distributed system, the Call Capacity Information (CCI) may be propagated in two ways: by piggybacking that information on an existing routing protocol's regular update or by a trigger update mechanism.

SUMMARY

A method and system for call admission control ("CAC") in a mesh network using on-device SIP proxy are disclosed. In one embodiment, a system for CAC in a mesh network using on-device SIP proxy is disclosed. The system has multiple client devices, mesh points ("MPs"), and mesh access points ("MAPs"). In one embodiment, a method of updating call capacity information ("CCI") is disclosed. Adaptive Wireless Routing ("AWR") protocol is used to establish connectivity among all the mesh access points. Periodic messages are sent to one or more of the plurality of nodes, wherein the routing messages include call capacity information. CAC modules on mesh portals or mesh access points can use the call capacity information to build up a CCI database for all of the MAPs and mesh portals in the mesh cloud to assist in the CAC decision-making.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
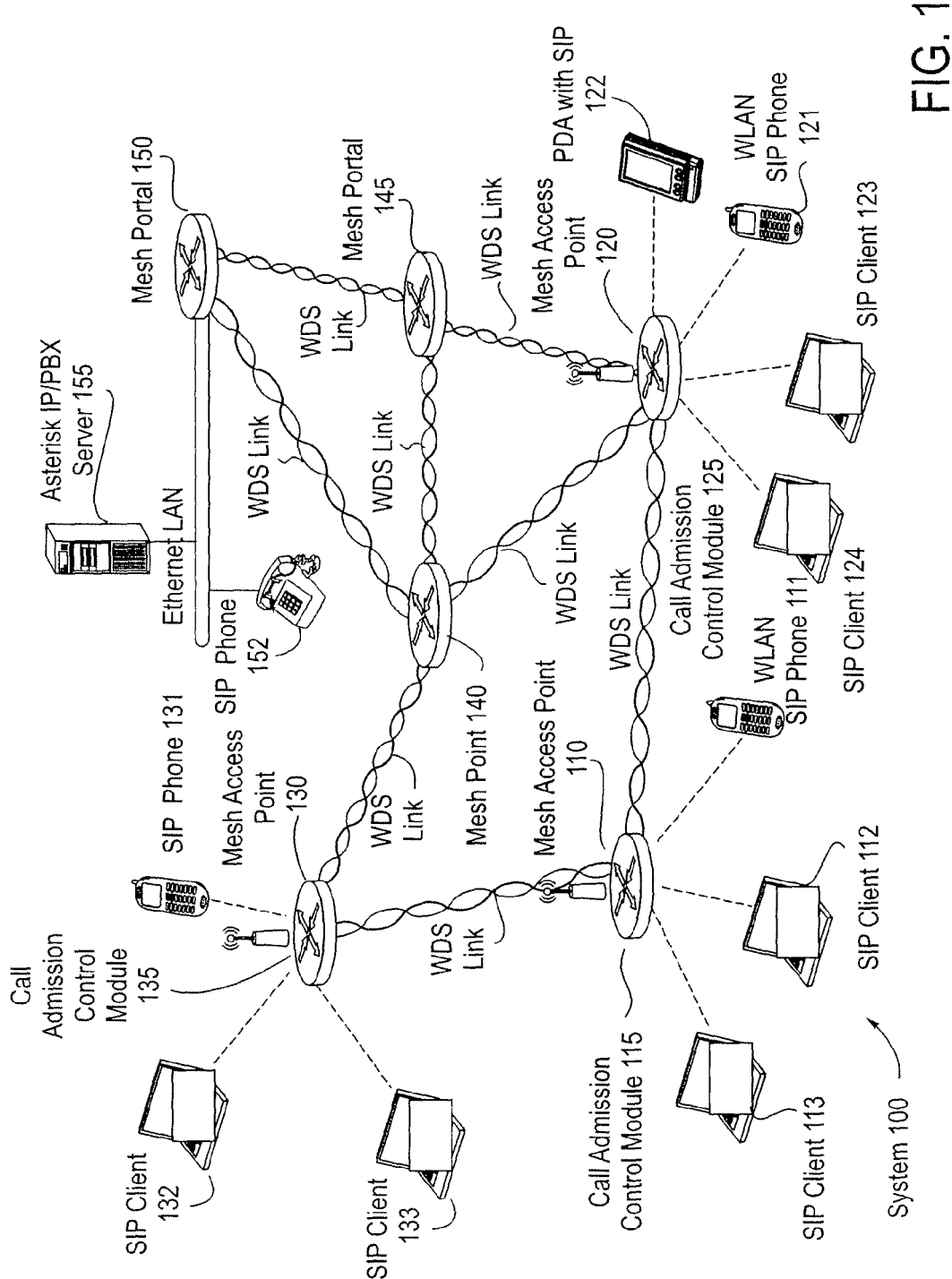
FIG. 1 illustrates a block diagram of an exemplary wireless mesh network, according to one embodiment of the present invention.

A method and system for call admission control ("CAC") in a mesh network are disclosed. In one embodiment, a system for CAC in a mesh network using on-device SIP proxy is disclosed. The system has multiple client devices, mesh points ("MPs"), and mesh access points ("MAPs"). In one embodiment, a method of updating call capacity information ("CCI") is disclosed. Adaptive Wireless Routing ("AWR") protocol is used to establish connectivity among all the mesh access points. Periodic messages are sent to one or more of the plurality of nodes, wherein the routing messages include call capacity information. CAC modules on mesh portals or mesh access points can use the call capacity information to build up a CCI database for all the MAPs and mesh portals in the mesh cloud to assist in the CAC decision-making.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed description that follow are presented in terms of wireless networks and computer systems. These wireless network descriptions and representations are the means used by those skilled in the wireless networking arts to most effectively convey the substance of their work to others skilled in the art. A wireless network is here, and generally, conceived to be a system for communications among two or more computers using radio waves as its carrier. Usually, though not necessarily, the information communicated between computer systems takes the form of packets. Furthermore, for reasons of common usage, the components of the packets are referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "router" or "radio" or "frequency" or "channel" or "backbone" or "packet" or "communicate" or the like, refer to the components and actions and processes of a network, or similar communication system, that transfers data represented as physical (electronic) quantities within the computer system's registers and memories or other such information storage, transmission or display device from one computer system to another.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The following list describes definitions for terms and acronyms used herein:

node: A router which implements adaptive wireless routing, according to the method and system described herein;

adaptive wireless routing interface: A network device participating in a wireless mesh running adaptive wireless routing protocol. A node may have several adaptive wireless routine interfaces.

link: A link is a pair of adaptive wireless routing interfaces (from two different nodes) susceptible to hear one another (i.e., one may be able to receive traffic from the other). A node is said to have a link to another node when one of its interfaces has a link to one of the interfaces of the other node.

WDS: wireless distribution system

SIP: Session Initiation Protocol

MSR: Mesh scalable routing

MAC: Media Access Control

QoS: Quality of Service

FIG. 1 illustrates a block diagram of an exemplary wireless mesh network 100. A mesh network client, such as SIP phone 111, needs to be set up with a subscriber account in order to gain access to mesh network 100. The clients in a mesh network 100 may include, for example, a wireless personal digital assistant (PDA), a mobile phone, a wireless local area network (LAN) router, or a wireless laptop. A wireless PDA may include Palm Pilots™ with wireless capabilities, Blackberrys™, or other hand-held devices with wireless capabilities. A wireless laptop may include any computer system with wireless capabilities. Although a wireless PDA, a wireless LAN router, a mobile phone, and a wireless laptop are described, any device with wireless capability may be considered as a mesh network client.

Mesh Portal 150 serves as a gateway to the Internet. According to one embodiment, Mesh Portal 150 connects to the Internet via a communications link, such as Ethernet. Through Ethernet Mesh Portal 150 may be connected to a server such as the Asterisk IP/PBX server 155. Ethernet may also connect Mesh Portal 150 with landline phones such as SIP Phone 152 using Session Initiation Protocol ("SIP"). Landline phones may initiate a call into mesh network 100, or may be the destination of a call initiated from within the mesh network 100. In a mesh network, multiple gateways may exist.

Mesh Portal 150 provides wireless Internet access to all the clients in mesh network 100 via Mesh Points, such as Mesh Point 140 and Mesh Point 145, which connect to Mesh Access Points ("MAP"s) 110, 120, and 130. Adaptive Wireless Routing ("AWR") protocol is used to establish connectivity among all of the mesh access points, mesh points, and the mesh portal. Mesh points are devices that can relay wireless signals to MAPs in the mesh network. In one embodiment, all of the mesh points are wireless LAN routers. Mesh access points (MAPs) are devices that are capable of relaying wireless Internet signals to or from SIP client devices. In one embodiment, all of the MAPs in mesh network 100 are wireless LAN routers. MAPs may be linked to other MAPs, mesh points, or even the mesh portal directly. The connectivity between each MAP in a mesh network is managed by mesh routing protocol (MSR). Often, MAPs are directly linked wirelessly to client devices. For example, client devices 111, 112, and 113 are linked to mesh access point 110. Client 111 is a wireless LAN phone that has SIP on the device. Client 112 and 113 are both wireless laptops with SIP on the devices.

Mesh access points 110, 120, and 130 each have processors residing on their respective devices to manage the VoIP calls in and out of the mesh network. In one embodiment, a Call Admission Control ("CAC") module on the processor of each device manages how many calls can be initiated or received by each mesh access point. The CAC module may insert a location-availability header field into each INVITE to call message or response to INVITE message it processes.

Figure 2:
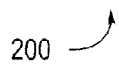
FIG. 2 illustrates a block diagram of an exemplary header for a call request, with call capacity information of location and availability in addition to the commonly existing address, according to one embodiment of the present invention.

FIG. 2 illustrates a block diagram of an exemplary header for a call request, with call capacity information of location and availability present in an extra header field (220), in addition to the header information normally present in an IEEE 802.11 frame (210). According to one embodiment of the present invention, after an INVITE message is sent by an SIP client device, the INVITE message is routed to a mesh access point. The CAC module of that mesh access point inserts location-availability header field 220, indicating from which mesh access point the INVITE message originated and how many other VoIP calls this particular mesh access point can handle (in addition to the current one) at the moment the INVITE message is sent. Thus, the extended header 200 represents the header field after processing by the CAC module of the MAP.

Figure 3A:
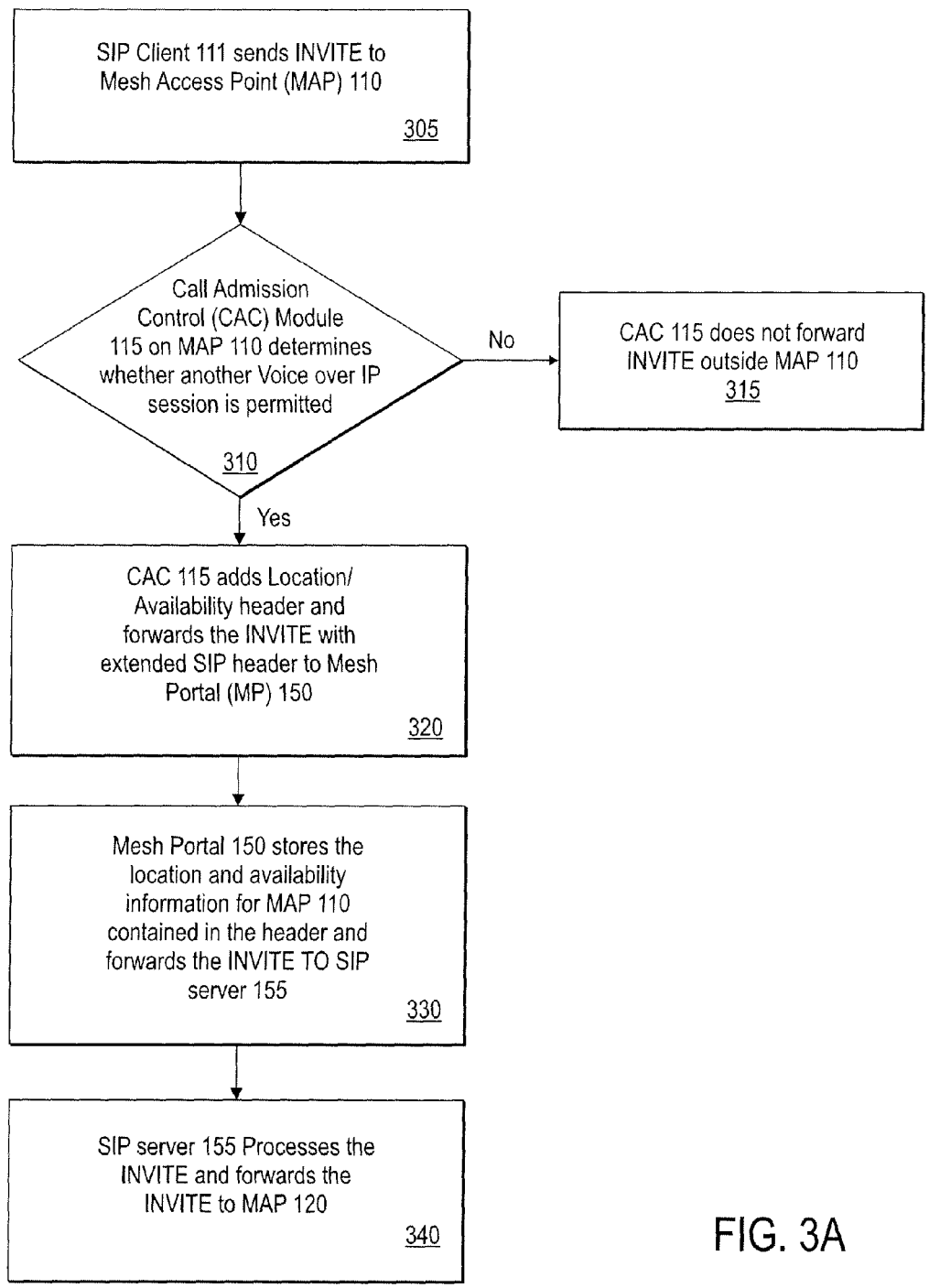
FIG. 3 illustrates a flow diagram of an exemplary process for a SIP client device to connect to another SIP client device via mesh portals, mesh points, and mesh access points by using an additional header field to represent location and availability information, according to one embodiment of the present invention.
Figure 3B:
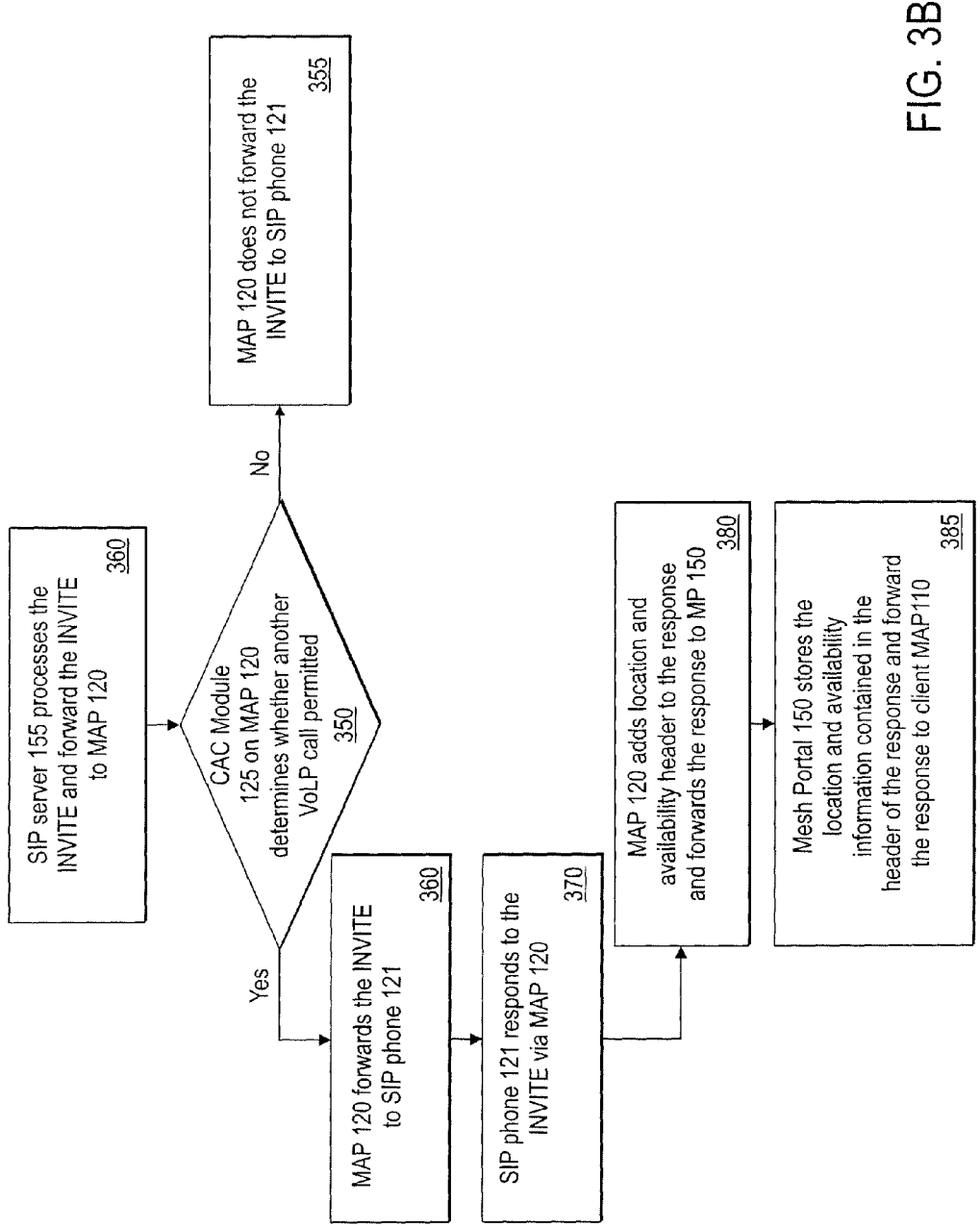

FIG. 3 illustrates a flow diagram of an exemplary process for a SIP client device to connect to another SIP client device via a mesh portal, mesh points, and/or mesh access points with an additional header field to represent location and availability information, according to one embodiment of the present invention. In one embodiment, client 111, a wireless LAN SIP phone, initiates a VoIP call to wireless LAN SIP phone 121 by sending an INVITE message to mesh access point 110 (305). CAC module 115 on mesh access point 110 determines whether another VoIP call is permitted, based on network capacity at mesh access point 110 (310). If there is no capacity for another call, CAC module 115 does not forward the INVITE message out of the mesh cloud around mesh access point 110 (315). The user of client 111 will probably see a signal on his/her SIP phone stating "network busy" or "call failed." If there is capacity for another call, CAC module 115 adds the location-availability header field to the INVITE message and forwards the INVITE message with the new extended SIP header to mesh portal 150 (320). Mesh portal 150 stores the location and availability information for mesh access point 110 and forwards the INVITE to SIP server 155 (330).

The SIP server 155 processes the information stored in the header to determine which phone should receive the INVITE. In one embodiment, SIP phone 152, a landline phone outside the mesh network, is the receiver. The server forwards the INVITE to SIP phone 152. In another embodiment, the destination phone is another SIP phone 121. Server 155 thus forwards the INVITE to mesh access point 120, to which SIP phone 121 is linked (340). CAC module 125 on mesh access point 120 determines whether another VoIP call is permitted in the mesh cloud around mesh access point 120 (350). If there is no capacity for another call, CAC 125 does not forward the INVITE message to SIP phone 121 (355). The user of SIP phone 152 will probably see a signal on his/her SIP phone stating "network busy" or "call failed." If there is capacity for another call, mesh access point 120 will forward the INVITE to SIP phone 121 (360).

When SIP phone 121 responds to the INVITE, it responds by sending a response message to mesh access point 120 (370). Mesh access point 120 inserts the location-availability header field to the response message and forwards the response message with extended header to mesh portal 150 (380). Mesh portal 150 stores the location-availability information on its processor, and forwards the response to mesh access point 110 (385). Mesh access point 110 forwards the response to client 111 and call setup and negotiation take place (390). After call setup and negotiation, SIP phones 111 and 112 can transmit voice data.

In another embodiment, network dynamics may determine that any one of the signals goes through one of the mesh points. As in the Internet, packets of information travel through the best route to reach the destination. In a mesh network, network dynamics provide that an INVITE message and a response to that INVITE message need not use the same route. At any time, an alternative route may be used for faster access. For example, if the INVITE message is sent by client 121 to client 131, it could go through either mesh point 140 or 145 to reach mesh portal 150. The fastest route is chosen.

Figure 4:
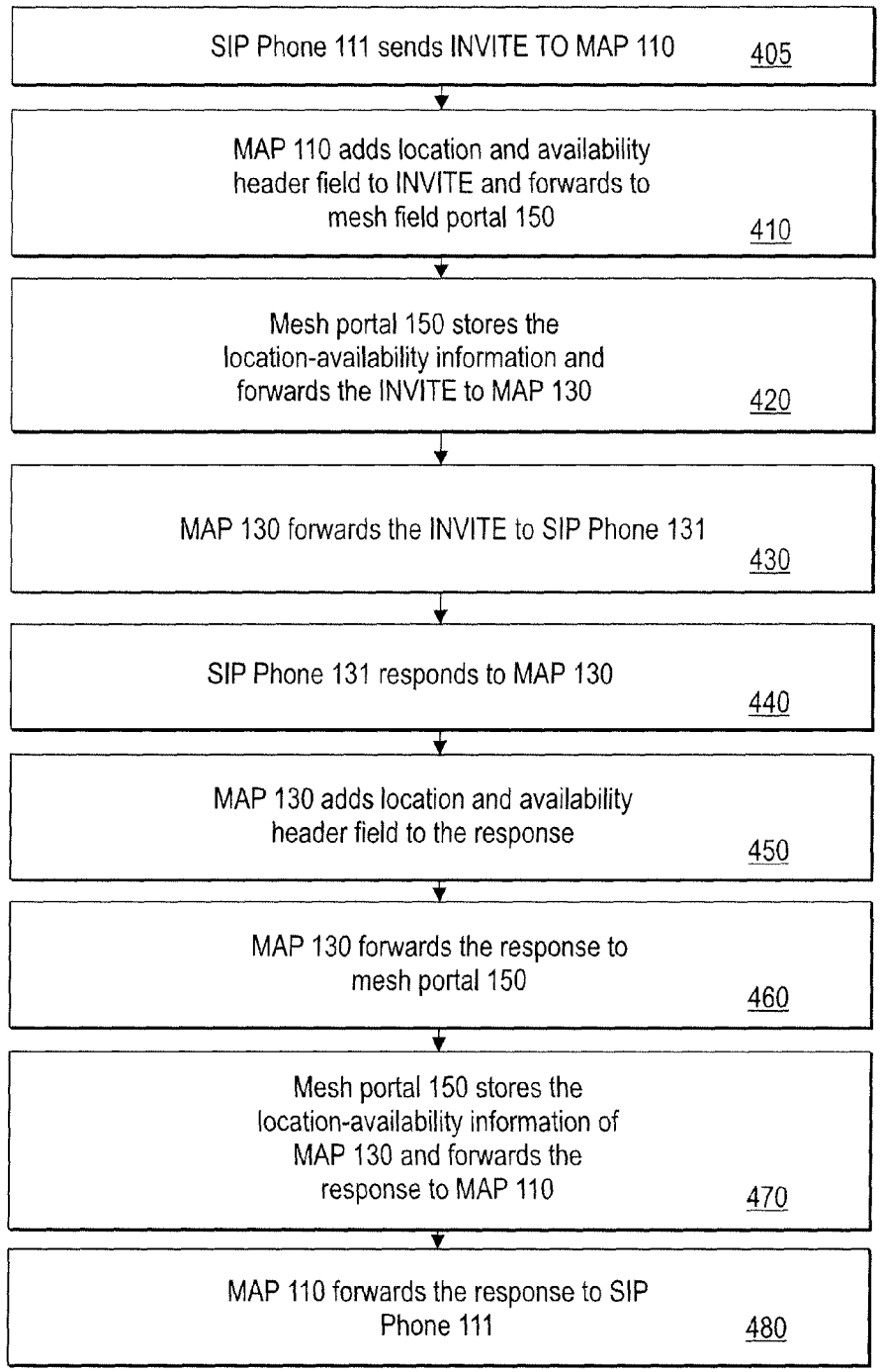
FIG. 4 illustrates a flow diagram of an exemplary process for a SIP client device to connect to another SIP client device via a centralized call admission control (CAC) process, according to one embodiment of the present invention.

In the alternative, mesh portal 150 may not forward the SIP message with the location-availability header to SIP server 155 that is outside the mesh network. Mesh portal 150 could act as a server itself. FIG. 4 illustrates this alternative process where mesh portal 150 acts as a server in a centralized fashion within the mesh network. In this alternative process, after mesh access point 110 forwards the INVITE message with a location-availability header field to mesh portal 150 (410), mesh portal 150 stores the location and availability information and forwards the INVITE message directly to another mesh access point in the mesh network, for example, mesh access point 130 (420). Mesh access point 130 forwards the INVITE message to SIP phone 131 in its own mesh cloud (430). SIP phone 131 responds by sending a response message to mesh access point 130 (440). Mesh access point 130 adds the location-availability information as an additional header field to the response (450) and forwards the response to mesh portal 150 (460). Mesh portal 150 stores the location-availability information of mesh access point 130 and forwards the response to mesh access point 110 (470). Mesh access point 110 then forwards the response to SIP phone 111 (480) and call setup and negotiation takes place.

In this alternative process, all of the INVITE messages and responses to them are routed through mesh portal 150, which acts as a server within mesh network 100. Mesh portal 150 stores the location-availability information of each mesh access point in mesh network 100. This is a centralized method of managing location and availability information. Mesh access points within the mesh network may be close to one another but do not know the operational status of neighboring mesh access points. This centralized method may be very efficient. Only one processor with greater capacity is needed on the mesh portal, so no large capacity processor is needed on any of the mesh points.

The process of not using a server outside the mesh network is only possible when a call is initiated and terminated in the same mesh network system. When landline phones or other mesh networks are involved, outside servers or at least other mesh portals have to be used.

Figure 5:
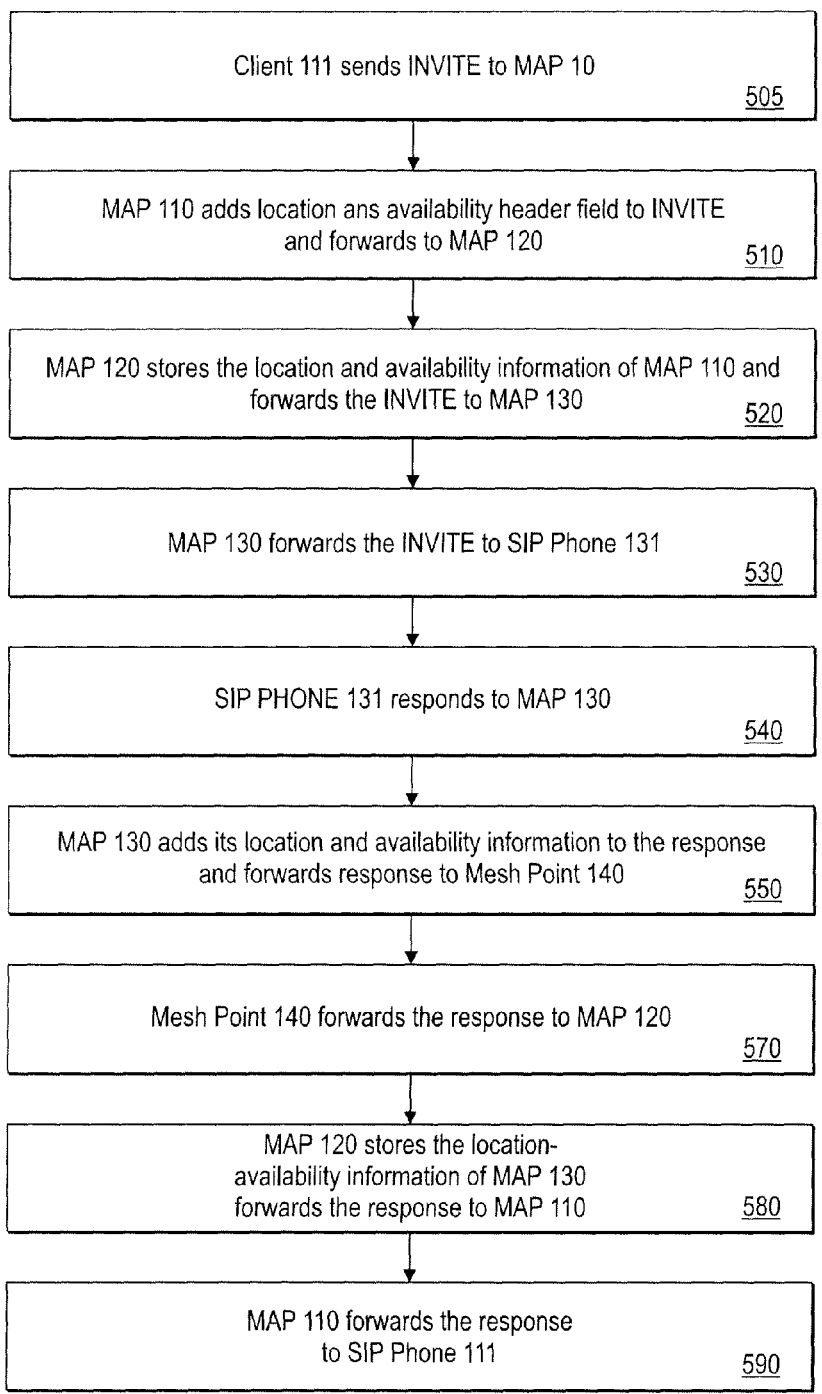
FIG. 5 illustrates a flow diagram of an exemplary process for a SIP client device to connect to another SIP client device via a distributed call admission control (CAC) process, according to one embodiment of the present invention.

FIG. 5 illustrates a flow diagram of an exemplary process for a SIP client device to connect to another SIP client device via a distributed call admission control process, according to one embodiment of the present invention. In this alternative process, Mesh Portal 150 may not be involved in call admission control within the mesh network. Instead, each mesh access point, or one of the mesh access points, acts as a server. The location-availability information of each mesh access point is therefore known by some or all of the other mesh access points or mesh points in the network. This distributed process for managing call admission control information has the advantage of not relying on a central server, thus if one node in the network fails, other nodes may take over its function.

In one embodiment, mesh access point 120 acts as a server in mesh network 100. SIP phone 131 sends an INVITE message to MAP 110 (505). After mesh access point 110 appends the location-availability header field to the INVITE message, it forwards the INVITE message to mesh access point 120 (510). Mesh access point 120 stores the location-availability information of mesh access point 110, and forwards the INVITE message to a device that connects to mesh access point 120, or if the destination is for a device that connects to mesh access point 130, mesh access point 120 forwards the INVITE message to mesh access point 130 (520). Mesh access point 130 forwards the INVITE message to SIP phone 131 (530) and SIP phone 131 transmits its response message to mesh access point 130 (540). Mesh access point 130 inserts its location-availability header to the response message (550) and forwards the response message to mesh access point 120 (570). Mesh access point 120 stores the location-availability information of mesh access point 130 and forwards the response back to mesh access point 110 (580). Mesh access point 110 forwards the response to SIP phone 111 (590) and call setup and negotiation take place.

In yet another embodiment, mesh access point 130 itself acts as a server (instead of mesh access point 120), or mesh access point 130 itself acts as a server in addition to mesh access point 120. SIP Phone 131 sends an INVITE message to mesh access point 110 (505). After mesh access point 110 appends the location-availability header field to the INVITE message, it forwards the INVITE message to mesh access point 130. Mesh access point 130 stores the location-availability information of mesh access point 110, and forwards the INVITE message directly to the destination client, SIP Phone 111.

There are potentially many call admission control processes taking place at any point in time in a mesh network. If each call admission control process involves inserting a location-availability header twice and storing the information twice, it may unnecessarily increase the load on the network. Furthermore, a mesh network may be busy at certain times and not busy at other times. A flexible way of providing the location-availability information is desirable. Therefore, in one embodiment of the invention, the call capacity of a mesh access point is evaluated. Call capacity information of a mesh access point is distributed only when it is useful for other mesh access points to reject calls destined for a certain mesh access point. According to one embodiment, when a mesh access point has significant excess capacity (e.g., more than 50% capacity) left, the mesh access point may be designated as in the green zone. When there is 10-50% of the capacity of the mesh access point available, the mesh access point may be designated as in the yellow zone. When there is less than 10% of the capacity of the mesh access point available the mesh access point may be designated as in the red zone. Call admission control modules send adaptive wireless routing (AWR) updates to other nodes in the mesh network regularly. The call capacity information will be added to the regular updates to inform other nodes of the capacity of a particular mesh access point.

Figure 6:
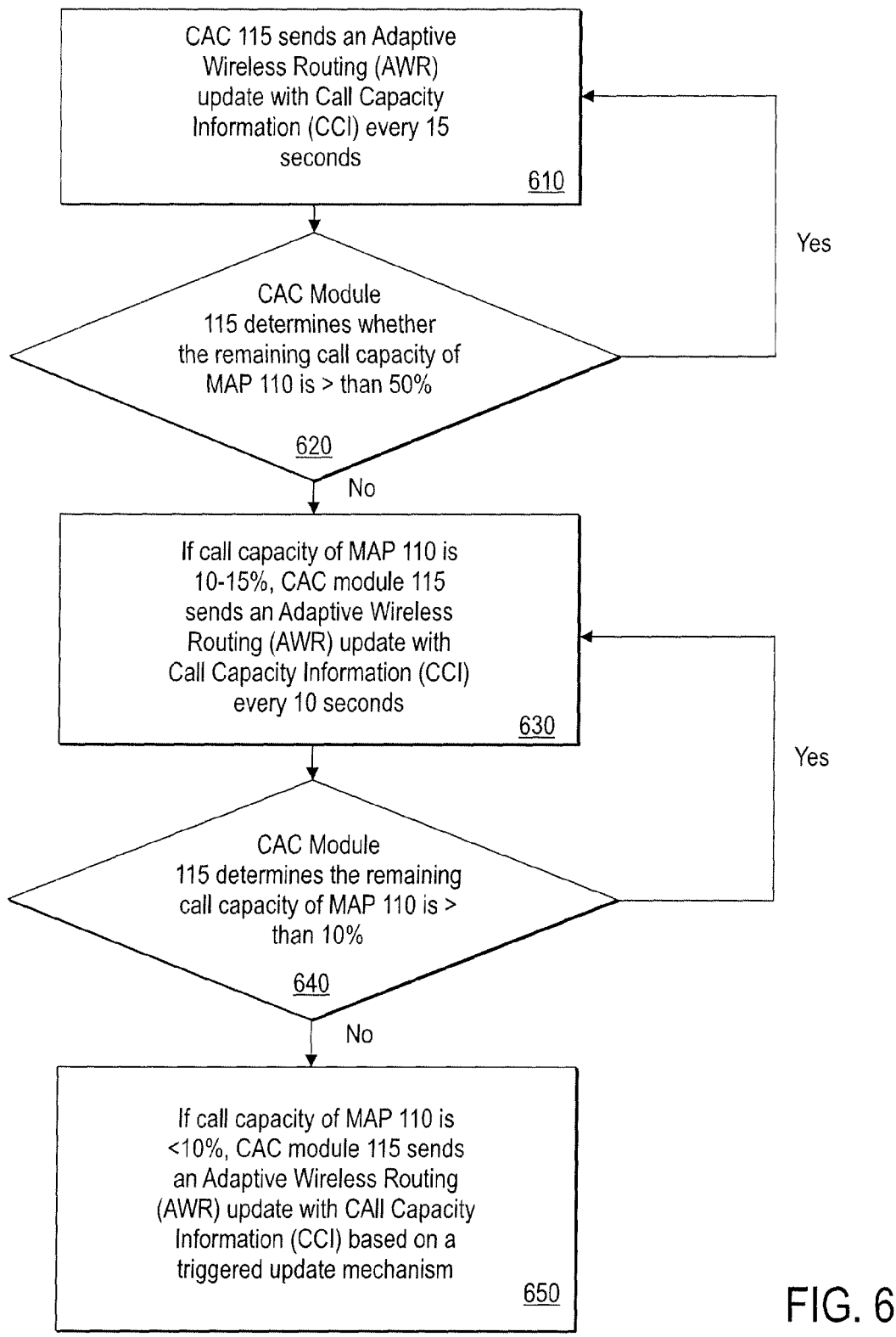
FIG. 6 illustrates a flow diagram of an exemplary process for a mesh access point to update its call capacity information to other nodes in the mesh network, according to one embodiment of the present invention.

FIG. 6 illustrates a flow diagram of an exemplary process for a mesh access point to update its call capacity information to other nodes in the mesh network, according to one embodiment of the present invention. In one embodiment, mesh access point 110 starts in the green zone with more than 50% of its call capacity available. CAC module 115 sends an adaptive wireless routing (AWR) update with call capacity information for mesh access point 110 at relatively long intervals, for example, every 15 seconds (610). Other nodes in the network register that the call capacity of mesh access point 110 is greater than 50%. A certain time after an update is sent, for example, 5 seconds afterwards, the CAC module 115 calculates its remaining call capacity (620). If the capacity remains at greater than 50%, the module still sends the updates at long intervals. If the call capacity has decreased to 10-15%, CAC module 115 starts sending updates at medium-length intervals, for example, every 10 seconds (630). The other nodes in the network register that mesh access point 110 is not as free as it was earlier. A certain time after an update is sent, for example, 2 seconds afterwards, the CAC module 115 calculates its remaining capacity (640). If the call capacity remains more than 10-15% available, the module still sends the updates at medium length intervals. If the call capacity has become less than 10% available, CAC module 115 starts sending updates based on a triggered update mechanism, either an INVITE message or a response to another INVITE message (650). The other nodes in the network register that mesh access point 110 is not free to accept messages anymore and stops relaying calls to mesh access point 110. After some time elapses, the call capacity of mesh point 110 begins to increase, and this process repeats itself.

It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:
1. A method, comprising:
receiving, by a mesh point in a mesh network, a call initiation message comprising a request for a call and a designated mesh router to which the call is to be routed, wherein the mesh point supports a distributed call admission control process for a call between at least two client devices in the mesh network;
determining whether the requested call in the call initiation message is permitted based on call capacity stored on the mesh point;
in response to the call being permitted, inserting call capacity information associated with the call capacity in the call initiation message, the call capacity information indicating (1) a second mesh point from which the call initiation message is originated and (2) a number of calls besides the requested call that can be handled when the call initiation message is sent; and routing the call initiation message to the mesh router designated in the call initiation message;

in response to the call not being permitted, stop routing the call initiation message to the mesh router designated in the call initiation message.

2. The method of claim 1, wherein the call capacity information comprises location and availability information of multiple mesh points in the mesh network.

3. The method of claim 1, wherein one or more mesh points in the mesh network act as a server to manage call admission control for the call between the at least two client devices.

4. A non-transitory computer-readable medium having stored thereon a plurality of instructions, said plurality of instructions when executed by a mesh point of a mesh network, cause said mesh point to perform the following:

receiving, by the mesh point of the mesh network, a call initiation message comprising a request for a call and a designated mesh router to which the call is to be routed, the mesh point supports a distributed call admission control process by storing data directed to call capacity for at least one other mesh point in the mesh network;

determining whether the requested call in the call initiation message is permitted based on call capacity stored on the mesh point;

in response to the call being permitted, inserting call capacity information associated with the call capacity in the call initiation message, the call capacity information indicating (1) a second mesh point from which the call initiation message is originated and (2) a number of calls besides the requested call that can be handled when the call initiation message is sent; and routing the call initiation message to the mesh router designated in the call initiation message in response to the call not being permitted, stop routing the call initiation message to the mesh router designated in the call initiation message.

5. The non-transitory computer-readable medium of claim 4, wherein the call capacity information comprises location and availability information of the mesh point.

6. The non-transitory computer-readable medium of claim 4, wherein the call initiation message includes source and destination information.

7. A mesh router supporting a distributed call admission control process, comprising:

a processor;

memory coupled to the processor; and a bus coupling the processor and memory;

wherein the memory stores instructions that are executed by the processor to:

receive a call initiation message;

determine to route the call initiation message to another mesh router based on call capacity and in accordance with the distributed call admission control process;

insert call capacity information associated with the call capacity in the call initiation message in response to a call being permitted, the call capacity information indicating (1) a second mesh point from which the call initiation message is originated and (2) a number of calls besides the requested call that can be handled when the call initiation message is sent; and route the call initiation message to the mesh router designated in the call initiation message.

8. The mesh router of claim 7, wherein the call capacity information comprises location and availability information of multiple mesh points in the mesh network.

9. The mesh router of claim 7, wherein the call initiation message includes source and destination information.

10. The mesh router of claim 7, wherein the call capacity information comprises location and availability information for a plurality of mesh network nodes.

11. A method, comprising:

storing call capacity information for a first mesh point in a second mesh point that includes a database of a mesh network so as to support a distributed call admission control process;

receiving, by the second mesh point, updated call capacity information for the first mesh point;

updating the call capacity information for the first mesh point in the database using the updated call capacity information; and routing the updated call capacity information of the first mesh point to a third mesh point designated in a routing update message at an interval, wherein the updated call capacity information indicates a number of calls besides the requested call that can be handled by the first mesh point, wherein the interval, at which the routing update message is routed, is adjusted in response to a change in the updated call capacity information as compared to a previous call capacity information associated with the first mesh point.

12. The method of claim 11, wherein the routing update message is updated at a periodic interval that is based on a call capacity level.

13. The method of claim 11, wherein the routing update message is updated by a trigger update mechanism when the updated call capacity falls below a threshold.

14. A non-transitory computer-readable medium having stored thereon a plurality of instructions, said plurality of instructions when executed by a second mesh point, cause said second mesh point to perform the following:

storing call capacity information for a first mesh point in the second mesh point that includes a database of a mesh network so as to support a distributed call admission control process;

receiving updated call capacity information for the first mesh point;

updating the call capacity information for the first mesh point in the database using the updated call capacity information; and routing the updated call capacity information of the first mesh point to the second mesh point designated in a routing update message at an interval, wherein the updated call capacity information indicates a number of calls besides the requested call that can be handled by the first mesh point, wherein the interval, at which the routing update message is routed, is adjusted in response to a change in the updated call capacity information as compared to a previous call capacity information associated with the first mesh point.

15. The non-transitory computer-readable medium of claim 14, wherein the routing update message is updated at a periodic interval that is based on a call capacity level of the first mesh point.

16. The non-transitory computer-readable medium of claim 14, wherein the routing update message is updated by a trigger update mechanism when the updated call capacity falls below a threshold.

17. The mesh router of claim 7, wherein the memory stores further instructions that are executed by the processor to:
- store call capacity information for a first mesh point in a database of a mesh network;
- receive updated call capacity information for the first mesh point;
- update the call capacity information for the first mesh point in the database using the updated call capacity information; and
- route the updated call capacity information of the first mesh point to a second mesh point designated in a routing update message, wherein the updated call capacity information indicates the number of calls besides the requested call that can be handled by the first mesh point.

18. The mesh router of claim 17, wherein the routing update message is updated at a periodic interval that is based on a call capacity level of the first mesh point.

19. The mesh router of claim 17, wherein the routing update message is updated by a trigger update mechanism when the updated call capacity falls below a threshold.

20. The method of claim 1, wherein the call initiation message comprises a Session Initiation Protocol (SIP) message.

21. The method of claim 1, further comprising:
- evaluating the updated call capacity information associated with the first mesh point;
- determining whether the updated call capacity information is useful for other mesh points; and
- responsive to determining that the call capacity information is useful for other mesh points, if so, inserting the call capacity information to an update message to inform the other mesh points of the updated call capacity information associated with the first mesh point.

22. The method of claim 1, wherein the updated call capacity information in the call initiation message identifies a level of available capacity in handling calls.

23. The method of claim 22, wherein the level of available capacity comprises at least three levels including a first level to identify an excess of a first predetermined capacity, a second level to identify an excess less than a second predetermined capacity, and a third level to identify an excess capacity between the first predetermined capacity and the second predetermined capacity.

24. The method of claim 23 further comprising:
- sending an update as to the level of available capacity, a periodicity of the update being based on a current level of available capacity.

25. The method of claim 1, wherein the call initiation message comprises an IEEE 802.11e based message.

\* \* \* \* \*